United States Patent
Duennwald et al.

(10) Patent No.: US 10,835,853 B2
(45) Date of Patent: Nov. 17, 2020

(54) RAIL VEHICLE HAVING A SEPARATING DEVICE FOR SEPARATING PARTICLES FROM AN AIR FLOW

(71) Applicant: SIEMENS MOBILITY GMBH, Munich (DE)

(72) Inventors: Tim Duennwald, Munich (DE); Arthur Obermaier, Unterschleissheim (DE); Thomas Plinninger, Rosenheim (DE)

(73) Assignee: Siemens Mobility GmbH, Munich (DE)

( * ) Notice: Subject to any disclaimer, the term of this patent is extended or adjusted under 35 U.S.C. 154(b) by 350 days.

(21) Appl. No.: 15/741,367

(22) PCT Filed: May 25, 2016

(86) PCT No.: PCT/EP2016/061741
§ 371 (c)(1),
(2) Date: Oct. 3, 2018

(87) PCT Pub. No.: WO2017/001121
PCT Pub. Date: Jan. 5, 2017

(65) Prior Publication Data
US 2019/0015772 A1    Jan. 17, 2019

(30) Foreign Application Priority Data

Jul. 1, 2015   (DE) .................. 10 2015 212 308

(51) Int. Cl.
*B01D 50/00* (2006.01)
*B01D 45/16* (2006.01)
(Continued)

(52) U.S. Cl.
CPC .......... *B01D 50/002* (2013.01); *B01D 45/16* (2013.01); *B01D 45/18* (2013.01); *B04C 3/06* (2013.01); *B04C 2003/003* (2013.01)

(58) Field of Classification Search
CPC ...... B01D 50/002; B01D 45/16; B01D 45/18; B04C 3/06; B04C 2003/003
See application file for complete search history.

(56) References Cited

U.S. PATENT DOCUMENTS 4,247,313 A * 1/1981 Perry, Jr. ............ B01D 46/0068
                                                      55/302
4,348,057 A * 9/1982 Parenti ................... B01D 45/16
                                                      299/12

(Continued)

FOREIGN PATENT DOCUMENTS

DE            837786 C     5/1952
DE          3041547 A1     5/1981
(Continued)

*Primary Examiner* — Dung H Bui
(74) *Attorney, Agent, or Firm* — Laurence Greenberg; Werner Stemer; Ralph Locher

(57) ABSTRACT

A rail vehicle or locomotive includes a machine compartment, a cooling air flow system supplying the machine compartment, and a separating device separating particles from the air flow. The separating device includes a cyclone separator, a raw air channel feeding a raw air flow with particles to the separator and a clean air channel leading a clean air flow away from the separator. The separator has a box-shaped housing having a plurality of cyclones penetrating the housing for separating particles from the raw air flow into the housing and a discharge opening discharging separated particles from the housing. The discharge opening is connected to a constricted section of a Venturi nozzle suctioning an exhaust air flow having discharged particles. The Venturi nozzle is connected to the raw air channel by a branching side channel. The vacuum at the discharge open- (Continued)

ing suctioning the exhaust air flow is compact and economical.

1 Claim, 1 Drawing Sheet

(51) Int. Cl.
    *B01D 45/18*           (2006.01)
    *B04C 3/06*            (2006.01)
    *B04C 3/00*            (2006.01)

(56) References Cited

U.S. PATENT DOCUMENTS

| | | | |
|---|---|---|---|
| 4,746,340 A * | 5/1988 | Durre | B01D 45/12 |
| | | | 55/347 |
| 4,971,603 A * | 11/1990 | Prinsloo | B04C 3/06 |
| | | | 95/269 |
| 5,403,367 A | 4/1995 | De Villiers et al. | |
| 5,472,463 A | 12/1995 | Herman et al. | |
| 7,267,706 B2 | 9/2007 | Schaerlund et al. | |
| 8,246,702 B2 | 8/2012 | Ackermann et al. | |
| 8,425,641 B2 * | 4/2013 | Chaudhari | B04C 3/06 |
| | | | 55/319 |
| 9,095,807 B2 | 8/2015 | Ackermann et al. | |
| 2004/0261383 A1 | 12/2004 | Schaerlund et al. | |
| 2013/0327002 A1 | 12/2013 | Ackermann et al. | |
| 2015/0075124 A1 * | 3/2015 | Guerry | B04C 5/081 |
| | | | 55/459.1 |

FOREIGN PATENT DOCUMENTS

| | | |
|---|---|---|
| DE | 10354400 A1 | 9/2004 |
| DE | 102005026811 A1 | 12/2006 |
| DE | 202008017059 U1 | 6/2010 |
| DE | 102012011358 A1 | 12/2013 |
| EP | 1918009 A1 | 5/2008 |
| GB | 2061774 A | 5/1981 |

* cited by examiner

RAIL VEHICLE HAVING A SEPARATING DEVICE FOR SEPARATING PARTICLES FROM AN AIR FLOW

BACKGROUND OF THE INVENTION

Field of the Invention

The invention relates to a rail vehicle, in particular a locomotive, including a machine compartment, a cooling air system for supplying the machine compartment with a cooled air flow, and a separating device for separating particles from the air flow.

Separating devices comprise a cyclone separator, a raw air channel leading to the cyclone separator for feeding a raw air flow laden with particles and a clean air channel leading away from the cyclone separator for leading away a clean air flow. The cyclone separator has a box-shaped separator housing having a plurality of separator cyclones penetrating the separator housing for separating particles from the raw air flow into the separator housing and a discharge opening for discharging separated particles from the separator housing.

Such separating devices are known for example from the published patent applications DE 10 2005 026 811 A1 and DE 10 2012 011 358 A1. The raw air flow flowing into the separator cyclone is in each case there displaced by guide vanes into a rotational movement, as a result of which the particles being carried in the flow are accelerated toward pipe walls of the separator cyclone by the centrifugal force experienced. The particles are collected at the pipe walls and are removed through discharge windows in lower sections of the pipe walls. The cleaned air is discharged at the other ends of the separator cyclone as a clean air flow, while due to gravity the separated particles fall down from the discharge windows onto the floor of the separator housing. To effectively transport the separated particles away out of the separator housing it is for example known from published patent application DE 10 1005 026 811 A1 to connect a discharge blower to the discharge opening, which generates a vacuum at the discharge opening to suction the particles and to transport them away via an exhaust air flow to which discharged particles have been added.

SUMMARY OF THE INVENTION

The object of the invention is to provide a rail vehicle of the type cited in the introduction, the separating device of which has a more compact structure and is more economical and low-maintenance than the known separating device.

The object is inventively achieved by a rail vehicle, in particular a locomotive, comprising a machine compartment, a cooling air system for supplying the machine compartment with a cooled air flow, and a separating device for separating particles from the air flow. The separating device includes a cyclone separator, a raw air channel leading to the cyclone separator for feeding a raw air flow laden with particles and a clean air channel leading away from the cyclone separator for leading away a clean air flow. The cyclone separator has a box-shaped separator housing having a plurality of separator cyclones penetrating the separator housing for separating particles from the raw air flow into the separator housing and a discharge opening for discharging separated particles from the separator housing. The discharge opening is connected to a constricted section of a Venturi nozzle for suctioning away an exhaust air flow to which discharged particles have been added, and the Venturi nozzle is connected to the raw air channel via a side channel branching off therefrom.

The separating device is used to clean an air flow of a cooling air system for supplying the machine compartment of the rail vehicle, in particular a locomotive. According to the invention the discharge opening is connected to a constricted section of a Venturi nozzle for suctioning away an exhaust air flow to which discharged particles have been added. The Venturi nozzle replaces the need to mount a discharge blower, including connections and controller thereof. This means the inventive separating device becomes more compact and because of the omission of the discharge blower is also more economical. Because the discharge blower is omitted the number of moving parts is reduced, as a result of which the inventive separating device also becomes lower-maintenance. The Venturi nozzle is connected to the raw air channel via a side channel branched off there from. The air flow required to generate the vacuum in the constricted section of the Venturi nozzle is advantageously branched off here from the raw air flow, thereby obviating the need for said air flow to be generated separately. Although as a result the raw air flow to be generated is somewhat larger, it can however be achieved by a slightly larger dimensioned blower or a somewhat higher blower rotation speed; however, reserves from a possible overdimensioning of the blower can also be used for this.

BRIEF DESCRIPTION OF THE SEVERAL VIEWS OF THE DRAWING

Further properties and advantages of the inventive separating device emerge from the following description of an exemplary embodiment on the basis of the drawings, in which FIG. 1 schematically illustrates an inventive separating device in a perspective view and FIG. 2 schematically illustrates the separating device from FIG. 1 in a longitudinal section.

DESCRIPTION OF THE INVENTION

Figure 1:
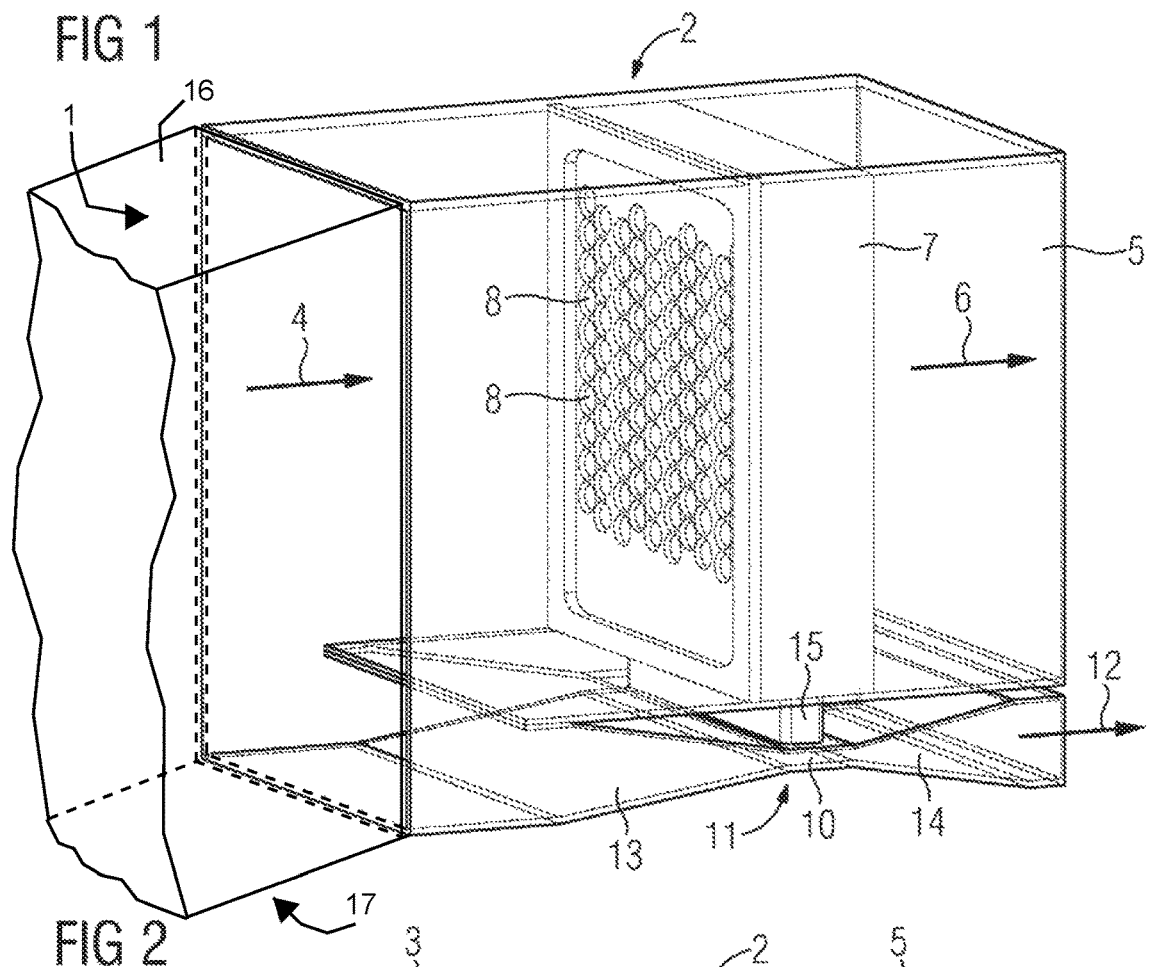
Figure 2:
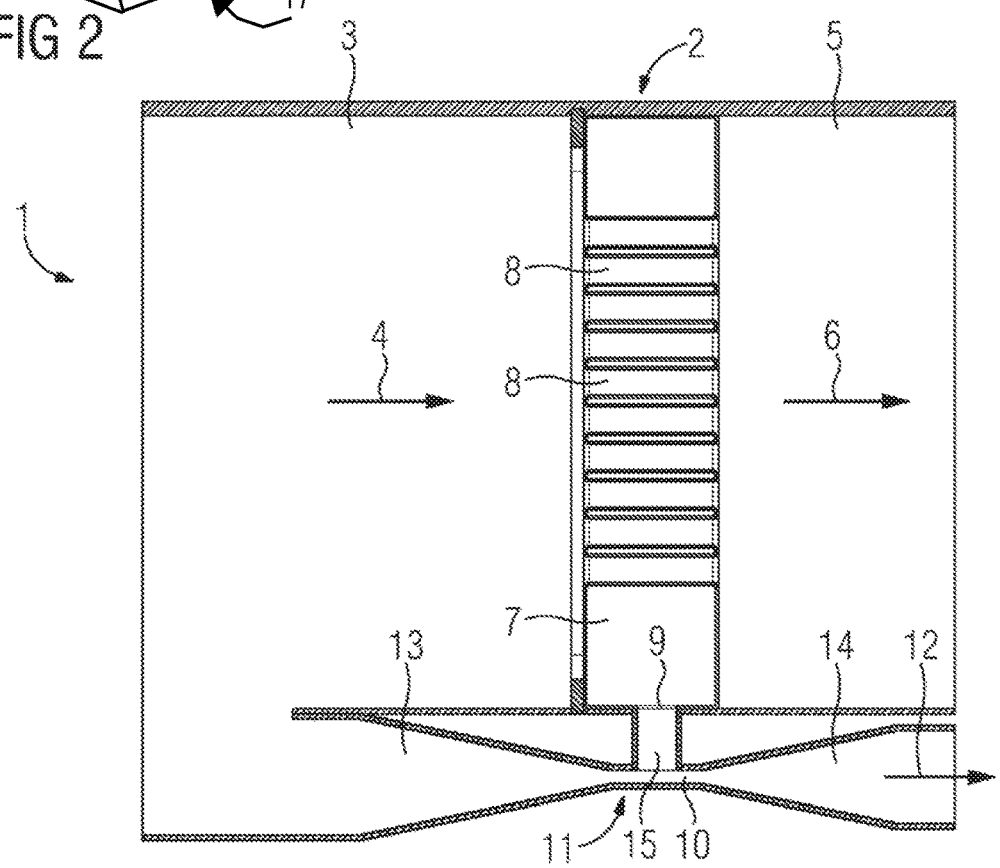

According to FIG. 1 and FIG. 2 a separating device 1 for separating particles, for example dust or water particles, from an air flow comprises a cyclone separator 2 known per se. The cyclone separator 2 is arranged in the rectangular cross-section of an air channel 16, which can be part of a cooling air system 17 for supplying a machine compartment of a locomotive with a cooled air flow. The air channel has a raw air channel 3, through which a raw air flow 4 to which particles have been added is led to the cyclone separator 2. Furthermore, the air channel has a clean air channel 5, through which a clean air flow 6 is led away from the cyclone separator 2. The cyclone separator 2 has a box-shaped separator housing 7. The separator housing 7 is penetrated by a plurality of separator cyclones 8 arranged parallel to one another and aligned in the flow direction, said separator cyclones 8 being designed to separate particles from the raw air flow 4 into the separator housing 7. The particles separated in the separator cyclones 8 fall onto a floor of the separator housing 7, in which there is a rectangular discharge opening 9 spanning the channel cross-section. Particles that have fallen on the floor are discharged from the separator housing 7 through the discharge opening 9. To this end a side channel 13 branches off from the raw air channel 3 upstream of the cyclone separator 2, the cross-section of said side channel 13 initially tapering down to a constricted section 10 and then widening out again to form an exhaust air channel 14. This side channel construction forms a Venturi nozzle 11, the constricted section 10 of which is connected to the discharge opening 9 via a discharge nozzle 15. The part of the raw air flow 4 branched off into the side channel 13 is accelerated thanks to the reduced cross-section such that a vacuum arises in the constricted section 10, by which the separated particles are suctioned out of the separator housing 7 with an exhaust air flow 12, which leaves the constricted section 10 via the exhaust air channel 14.

In this way the need for a separate discharge blower for generating a vacuum at the discharge nozzle 15, along with connections and controller thereof, is likewise obviated. The inventive separating device therefore takes up less space and thanks to the avoidance of moving parts is also lower-maintenance and less prone to faults.

The invention claimed is:
1. A rail vehicle or locomotive, comprising:
   a machine compartment;
   a cooling air system for supplying said machine compartment with a cooled air flow; and
   a separating device for separating particles from the air flow, said separating device including a cyclone separator, a raw air channel leading to said cyclone separator for feeding a raw air flow laden with particles, said raw air channel having a side channel branching off from said raw air channel, a clean air channel leading away from said cyclone separator for leading away a clean air flow, and a Venturi nozzle having a constricted section, said Venturi nozzle being connected through said side channel to said raw air channel;
   said cyclone separator including a box-shaped separator housing having a plurality of separator cyclones penetrating said separator housing for separating particles from the raw air flow into said separator housing and a discharge opening for discharging separated particles from said separator housing; and
   said discharge opening being connected to said constricted section of said Venturi nozzle for suctioning away an exhaust air flow to which discharged particles have been added.

* * * * *